No. 786,371.

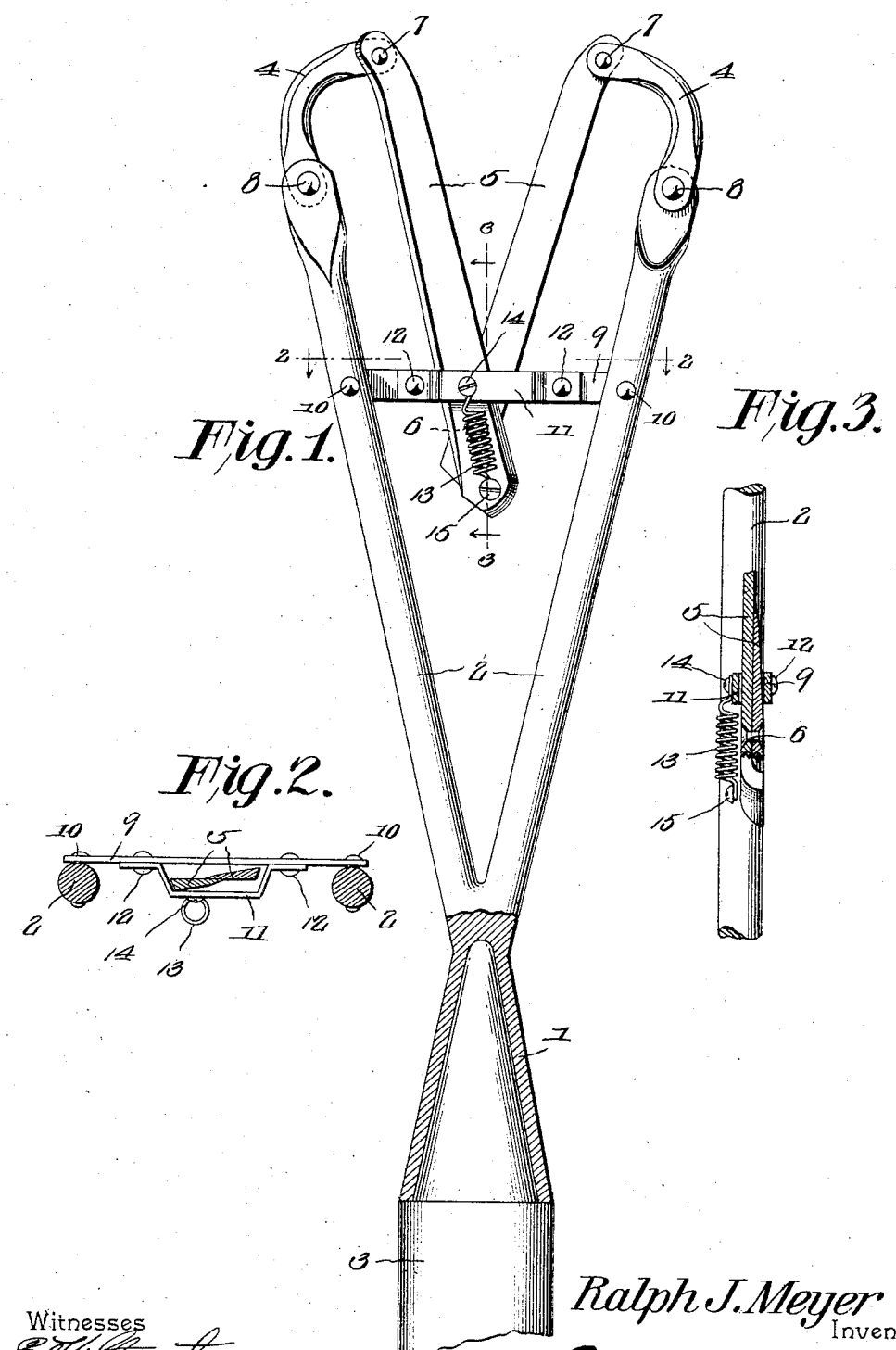

Patented April 4, 1905.

UNITED STATES PATENT OFFICE.

RALPH J. MEYER, OF GRAND JUNCTION, COLORADO, ASSIGNOR OF ONE-HALF TO GUSTAVE VAN HOOREBEKE, OF GRAND JUNCTION, COLORADO.

PRUNING IMPLEMENT.

SPECIFICATION forming part of Letters Patent No. 786,371, dated April 4, 1905.

Application filed December 19, 1904. Serial No. 237,526.

*To all whom it may concern:*

Be it known that I, RALPH J. MEYER, a citizen of the United States, residing at Grand Junction, in the county of Mesa and State of Colorado, have invented a new and useful Pruning Implement, of which the following is a specification.

This invention relates to pruning implements.

The object of the invention is to provide an implement of the class described which shall be thoroughly effective in lopping off overhead branches, in which the labor of operating the same is reduced to a minimum, in which the employment of a lever or the like for actuating the cutting elements is dispensed with, and in which the thrust-pressure from the limb or branch between the cutting elements will operate to cause them to approach each other, and thus effect severing of the part with which they coact.

With the above and other objects in view, as will appear as the nature of the invention is better understood, the same consists in the novel construction and combination of parts of a pruning implement, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

In the drawings, Figure 1 is a view in elevation, partly in section, of a pruning implement constructed in accordance with the present invention. Fig. 2 is a view in horizontal section taken on the line 2 2 of Fig. 1 and looking in the direction of the arrow thereon. Fig. 3 is a view in vertical section taken on the line 3 3 of Fig. 1.

Referring to the drawings, there is shown a stock comprising a socket member 1 and two arms 2, these parts by preference being integral, although it is to be understood that if preferred they may be made as separate elements and combined in any suitable manner. Secured in the socket 1 in any suitable manner is a handle 3, the connection between the socket and handle being preferably of a detachable character in order that the handle may be removed when desired for the purpose of employing a longer or shorter one, as may be found necessary or desirable. The arms 2 fork or diverge outward, forming thereby a V-shaped crotch, and to the outer or free terminals of the arms and on opposite sides thereof are pivotally connected links 4, which curve inward in opposite directions, as clearly shown in Fig. 1. Pivotally connected with the free or opposed ends of the links are the members of a pair of shear-blades 5, which may be of the usual or any preferred construction and are connected near their lower ends by a pivot or bolt 6. In order to cause the edges of the cutting elements 5 to secure a shear cut and always to work against each other, and thus be self-sharpening, these elements are pivoted at 7 on the opposite sides of the link-terminals, the links being pivoted at 8 to the stock-arm. The pivots 7 and 8 may be of any preferred construction, preferably of the type that will permit of removal in case of breakage or wear. In order to prevent vibratory or sidewise movements of the cutting elements in use, there is a guide provided, through which the lower pivoted ends of the cutting elements project, and this guide comprises a plate 9, which is secured to the stock-arms by rivets 10, and an arch-plate 11, secured to the plate 9 by rivets 12, as clearly shown in Fig. 2. In order to cause the blades normally to retain the position shown in Fig. 1—that is, open—there is a coiled spring 13 provided, one terminal of which is secured to the plate 11 by a screw or rivet 14 and the other terminal to one of the cutting elements by a screw or rivet 15.

It will readily be seen from the above description that the pruning implement of the present invention operates in diametrically the opposite manner to those in ordinary use, as a thrust instead of a pull is relied upon for causing the cutting elements to perform their functions.

In the use of the implement the cutting elements are caused to straddle the branch or shoot to be severed, and upon a strong upward thrust being given to the handle 3 the cutting elements will be caused to approach each other and by a shear cut effect the pruning of the object. As soon as the upward thrust from the cutting elements is relieved these, through the medium of the spring 13, will immediately resume their normal positions.

The implement as a whole is of simple construction, will be found of highest efficiency and durability in use, and owing to the manner in which the parts are constructed and combined repairs may be readily and cheaply effected when necessary.

Having thus described the invention, what is claimed is—

1. A pruning implement embodying a two-armed stock, a pair of thrust-operated cutting elements disposed between the stock-arms and pivotally connected at their inner ends, and links pivotally connecting the outer ends of the cutting elements and the stock-arms.

2. A pruning implement embodying a two-armed stock, a pair of thrust-operated cutting elements disposed between the stock-arms and pivotally connected at their inner ends, links pivotally connecting the outer ends of the cutting elements and the stock-arms, and means for causing the cutting elements normally to remain open.

3. A pruning implement embodying a two-armed stock carrying a guide, a pair of cutting elements disposed between the stock-arms and engaging the guide and having their inner ends pivotally connected, links pivotally connecting the outer ends of the cutting elements and the stock-arms, and a spring connected with the guide and with the cutting elements to cause the latter normally to remain open.

In testimony that I claim the foregoing as my own I have hereto affixed my signature in the presence of two witnesses.

RALPH J. MEYER.

Witnesses:
J. S. CARNAHAN,
R. H. REYNOLDS.